H. R. LELAND.
GAS AND LIQUID SEPARATOR.
APPLICATION FILED OCT. 14, 1920.
1,372,240.
Patented Mar. 22, 1921.
2 SHEETS—SHEET 1.
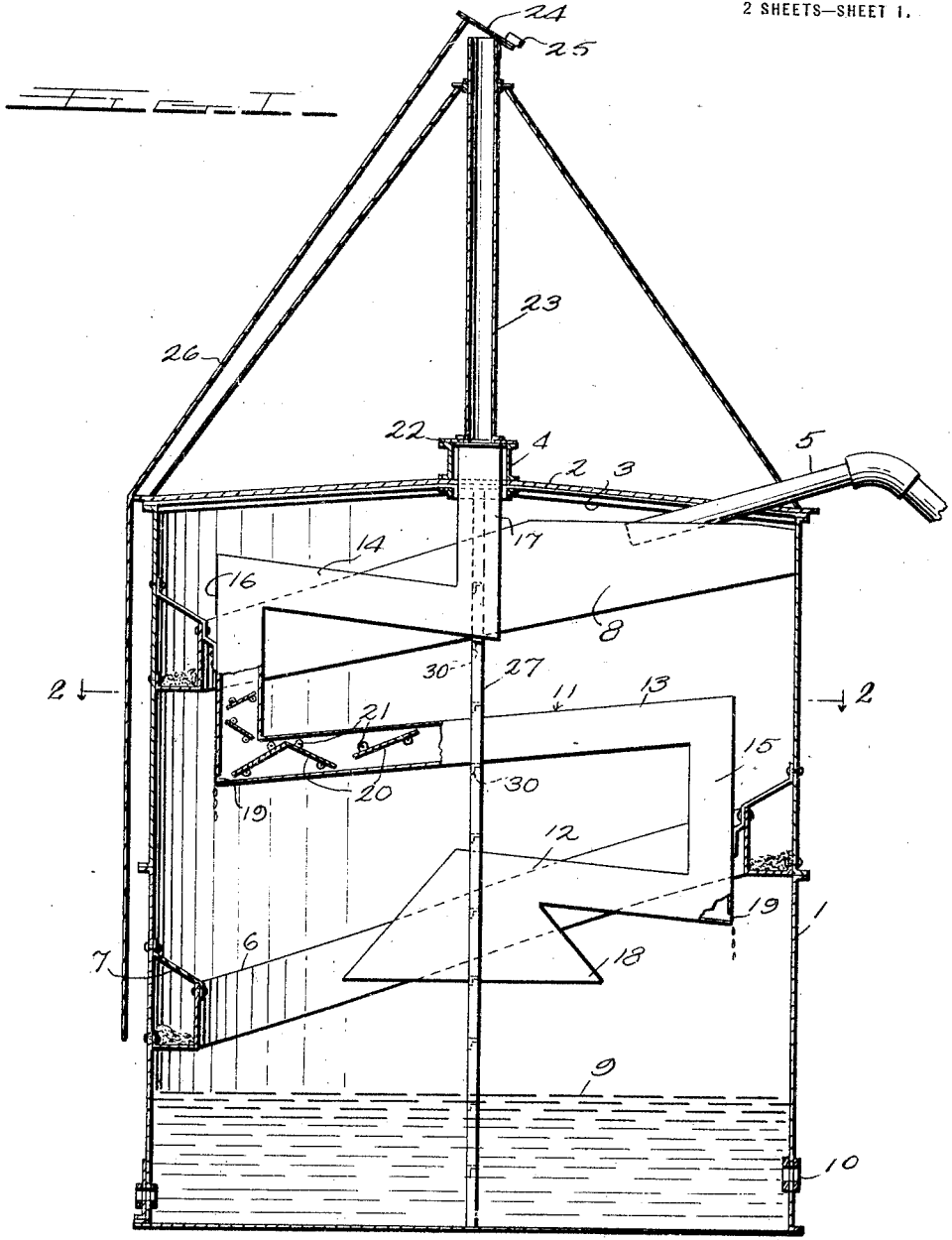
Inventor
Harry R. Leland
By [signature]
Attorney

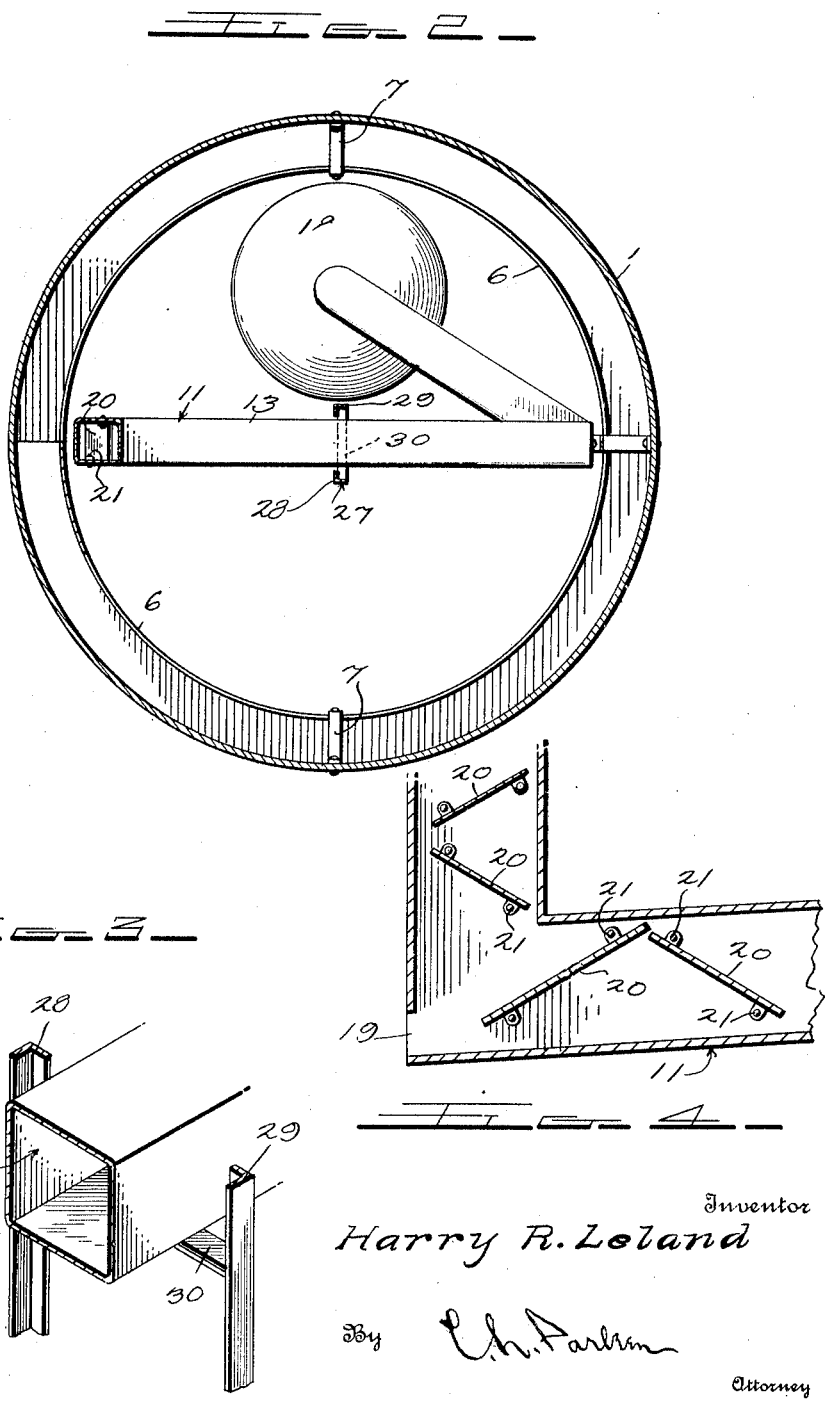

UNITED STATES PATENT OFFICE.

HARRY R. LELAND, OF PARKERSBURG, WEST VIRGINIA, ASSIGNOR TO THE PARKERSBURG RIG & REEL COMPANY, OF PARKERSBURG, WEST VIRGINIA, A CORPORATION OF WEST VIRGINIA.

GAS AND LIQUID SEPARATOR.

1,372,240.  Specification of Letters Patent.  Patented Mar. 22, 1921.

Application filed October 14, 1920. Serial No. 416,790.

*To all whom it may concern:*

Be it known that I, HARRY R. LELAND, a citizen of the United States, residing at Parkersburg, in the county of Wood and State of West Virginia, have invented certain new and useful Improvements in Gas and Liquid Separators, of which the following is a specification.

This invention relates to gas and liquid separators, and it comprises a closed tank having means for delivering gases and liquid thereto, a trough arranged within the tank and extending circumferentially and downwardly, said trough being open at the top, a gas collector comprising a pipe or tube arranged within the tank and connected to a suitable outlet, and baffles arranged in said tube to collect any liquid contained in the gases passing through said tube.

In oil producing fields, the oil as it leaves the well is pumped into a flow tank whence it is delivered to storage tanks. As a general rule, this oil contains a certain amount of gas which, in escaping therefrom, has a tendency to carry off considerable volume of oil in small drops or globules giving a misty appearance over a tank into which oil is being pumped. I have found that if the oil is spread out into a thin layer having a comparatively large surface, that the escape of gas is not so violent and that the tendency to carry off oil is thereby diminished. The oil carried off in the form of a vapor or mist is generally the lighter low boiling fractions which are more valuable than the heavy components of the oil and and loss incident thereto is greatly increased.

By providing a trough within a tank and causing the oil to flow through this trough for a considerable distance before it is deposited into the body of oil in the bottom of the tank, I have found that the loss of low boiling constituents, in connection with the liberation of the gases in the oil, is greatly reduced. I have also found that the loss can be reduced to a minimum by passing the gases immediately through a closed tube having baffles or other means for restraining the flow of gas and collecting any oil contained therein, the oil being conveyed to the body of oil in the bottom of the tank.

In the accompanying drawings, I have shown one embodiment of my invention. In this showing, Figure 1 is a vertical sectional view of the apparatus.

Fig. 2 is a horizontal sectional view on the line 2—2 of Fig. 1.

Fig. 3 is a detail perspective view showing the means for supporting the oil collecting tube, and Fig. 4 is a detail sectional view of the tube.

Referring to the drawings, the reference numeral 1 designates generally a tank constructed in the manner described in my copending application, Serial No. 423,291, filed November 11, 1920, in which the deck of the tank is made absolutely gas tight. The tank is provided with a deck 2 supported on rafters 3 and having a manhole opening 4 arranged therein. The oil and gas to be separated are delivered to the tank through a feed pipe 5. A trough 6 is arranged within the tank, the trough being preferably arranged in the form of a spiral as shown, and being supported from the side of the tank by brackets 7 as shown. The upper end of the trough immediately beneath the feed pipe is enlarged as at 8 to prevent the oil from splashing over the side of trough into the bottom of the tank. The oil passing from the trough is delivered from the bottom of the tank as indicated at 9, and is continually withdrawn therefrom through an outlet opening 10 by suitable means (not shown). A gas collecting tube 11 is arranged within the tank, the tube comprising a substantially rectangular body portion arranged in horizontal sections 12, 13, and 14, connected by vertical sections 15, 16, and 17. The lower horizontal section is provided with an enlarged funnel shaped mouth 18 through which the gases enter. Each of the horizontal sections is inclined downwardly toward the outlet and is provided at its lower end with an opening 19 whereby oil collected may be delivered to the bottom of the tank. A plurality of baffles 20 are arranged within the tube, the baffles being secured to the side walls thereof. Any suitable means may be employed for securing the baffles in position, and I have shown one means wherein ears 21 are arranged on the edges of the baffle plates adapted to receive suitable fastening means to secure them to the walls of the tube. As shown, the baffles are spaced at their lower ends from the bottom of the tube to permit flow of oil deposited on the plates to the openings 19.

The upper end of the vertical section 17 is connected to a cap or cover 22 arranged in the manhole opening. This cover is provided with a centrally arranged opening communicating with a pipe 23 arranged on the cover. The exhaust pipe 23 is provided with a hinged cover 24 having a weight 25 to normally maintain it in open position. A cord 26 is connected to the end of the cover whereby it may be closed when desired.

The tank is provided with the usual ladder 27 and the horizontal sections of the gas collecting tube are passed between the legs 28 and 29 of the ladder and rest on one of the rungs (see Fig. 3).

In operation, the gas-containing oil is delivered to the tank through pipe 5 into the upper end 8 of the trough 6. The oil flows downwardly in the trough in a spiral path and is delivered to the bottom of the tank as indicated at 9. During its passage through the trough, the increased surface provided permits the gas to separate from the oil more gradually than if the oil were pumped into the body of oil in the bottom of the tank. The escaping gas enters the gas tube 11 through the funnel shaped opening 18, the body of oil in the bottom of the tank being always maintained below the opening 18. In passing through the collecting tube the gas is continually brought into contact with the baffles 20 and any oil contained in the gas is deposited on these baffles. The oil collecting in the tubes passes down the inclined bottom to the openings 19 whence it is delivered to the bottom of the tank. The gases passing through the outlet pipe 23 are delivered to the atmosphere or to any suitable container.

It is to be understood that while I have described the preferred embodiment of my invention, various changes in the shape, size, and arrangement of parts may be made without departing from the spirit of the invention or the scope of the subjoined claims.

Having thus described my invention, I claim:

1. A liquid and gas separator comprising a closed tank, means for delivering the liquid and gaseous mixture into the tank, a collecting tube provided with an outlet and an enlarged inlet, said tube comprising downwardly inclined sections, inclined in the direction of flow of the gases, and substantially vertical connecting sections, said downwardly inclined sections being provided with openings at their lowest points, and means for collecting liquid contained in the gases passing through said tube.

2. A liquid and gas separator comprising a closed tank, means for delivering the liquid and gaseous mixture into the tank, a collecting tube provided with an outlet and an enlarged inlet, said tube comprising slightly inclined sections and vertical connecting sections, said inclined sections being inclined downwardly in the direction of flow of the gases and provided with outlets at their lowest points, and baffle plates arranged in said tube to collect liquid contained in the gases.

In testimony whereof I affix my signature in presence of two witnesses.

HARRY R. LELAND.

Witnesses:
  HARRY P. JONES,
  BERT C. KOETHE.